UNITED STATES PATENT OFFICE.

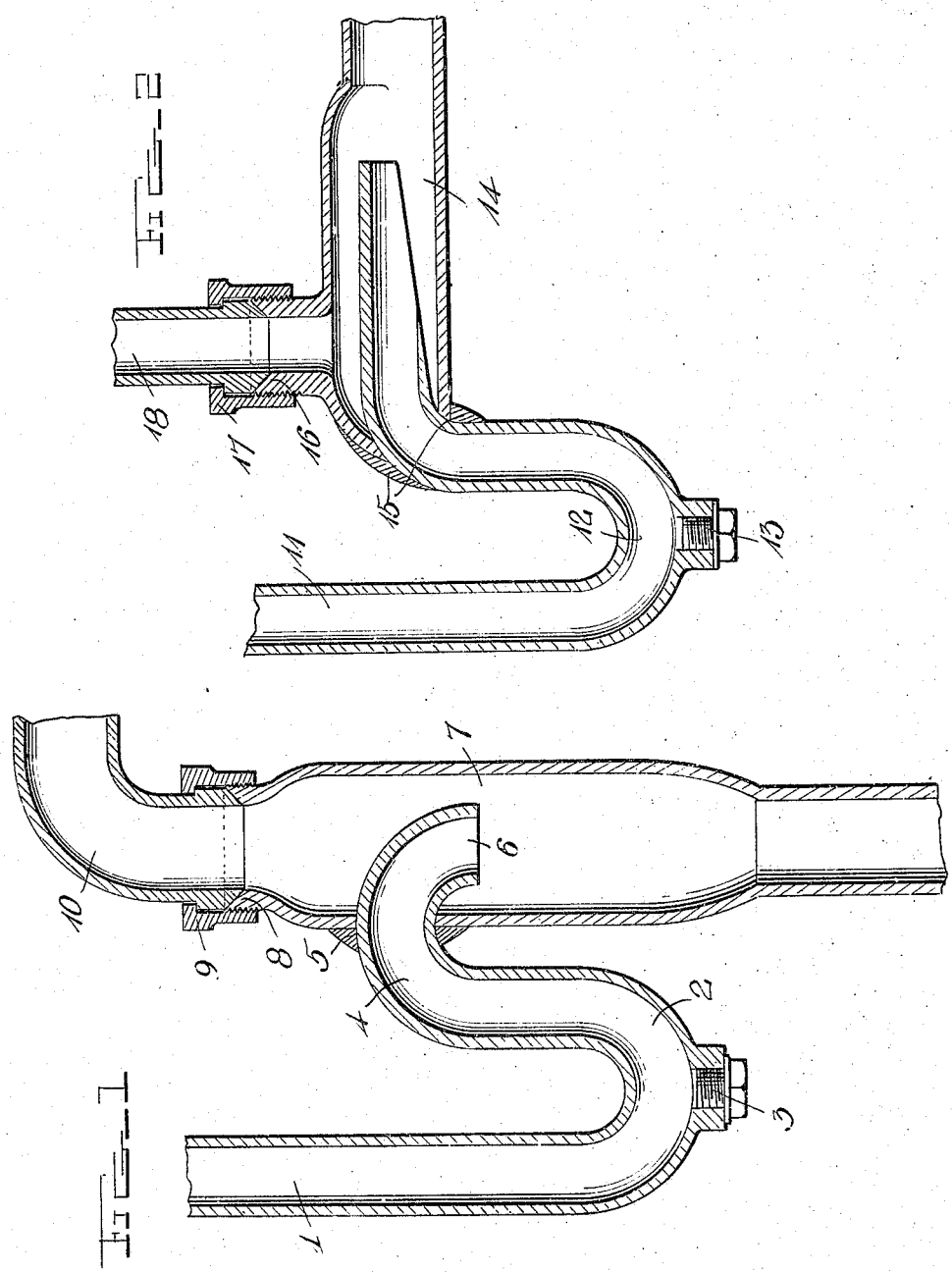

LAWRENCE E. WELCH, OF MERIDEN, CONNECTICUT.

WASTE-TRAP.

933,279.  Specification of Letters Patent.  Patented Sept. 7, 1909.

Application filed May 28, 1908. Serial No. 435,495.

*To all whom it may concern:*

Be it known that I, LAWRENCE E. WELCH, a citizen of the United States, residing at Meriden, in the county of New Haven and State of Connecticut, have invented certain new and useful Improvements in Waste-Traps; and I do declare the following to be a full, clear, and exact description of the invention, such as will enable others skilled in the art to which it appertains to make and use the same.

My invention relates to waste traps and particularly to that type of trap used in connection with sinks, lavatory bowls and laundry tubs.

Heretofore the traps whether an S, a half S, a three-quarter S or a run-way trap, were constructed of pipes of the same size throughout their length and were connected to the discharge pipe, also of the same diameter. Furthermore, the vent pipe was connected directly to the second bend of the pipe so that the waste in the discharge frequently stopped the vent pipe and prevented proper ventilation.

It is the object of my invention to obviate these difficulties, and broadly speaking consists in discharging the contents of the lavatory bowl, sink or laundry tub into an enlarged discharge or sewage pipe, which surrounds the discharge end of the trap and in connecting the vent pipe to the top of the discharge or sewage pipe in such a manner that the waste being discharged from the bowl or tub will not enter or obstruct the vent pipe.

With these and other objects in view, the invention consists of certain novel features of construction, combination and arrangement of parts, as will be more fully described and particularly pointed out in the appended claims.

In the drawings, Figure 1 is a section of an S trap, and Fig. 2 is a sectional view of a half S trap.

Referring more especially to the drawings, 1 represents the pipe which leads from the lavatory bowl, laundry tub or sink, which is connected to the trap 2, provided on its under side with the usual flushing nipple 3. The opposite hook or leg of the trap 4 is secured by a wiped-joint with its discharge end 6, extending into a central position within the enlarged discharge or sewage pipe 7. Situated on top of the discharge pipe 7, which extends above the hook 4 is the coupling member 8, threaded upon its outer side to receive the locking nut 9, of the vent pipe 10. As is shown the vent pipe is put together with the coupling member 8 by a crown-joint so that no washers are used.

In the construction shown in Fig. 2 the down spout or pipe 11, from the bowl is connected to the trap 12, with the usual flushing nipple 13. The opposite end of this half S trap enters and is passed over the bottom of the interior of the enlarged discharge or sewage pipe 14, which is connected to the discharge end of the trap by a wiped-joint 15. On the top of the discharge pipe 14 I provide a coupling 16, which is threaded to engage the lock nut 17, of the vent pipe 18. In this instance the bottom of the discharge or sewage pipe 14 is preferably made straight, and is bulged on its upper side so as to be entirely free of the discharge end of the trap.

It will be noticed from the inspection of Fig. 2 that the under side of the discharge end of the trap is cut away, so as to provide for proper ventilation.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is.

1. The combination with a waste pipe having an enlarged receiving portion, and a trap having its discharge end projecting a suitable distance into the transverse center of said pipe whereby the discharge end is held free of the pipe and a space is formed entirely around the same, between said end and the wall of the waste pipe.

2. The combination with a waste pipe having an enlarged receiving portion, and a trap having its discharge end projecting a suitable distance into the transverse center of said pipe, whereby the discharge end is held free of the pipe and a space is formed entirely around the same, between said end and the wall of the waste pipe, said discharge end being sheared off on its underside to provide a space for proper ventilation.

In testimony whereof I have hereunto set my hand in presence of two subscribing witnesses.

LAWRENCE E. WELCH.

Witnesses:
  L. C. PARDEE,
  BENJ. PAGE.